Oct. 9, 1923.
E. L. CHAFFEE
1,469,889
RECEIVING SYSTEM FOR RADIANT ENERGY
Original Filed April 25, 1918   3 Sheets-Sheet 1
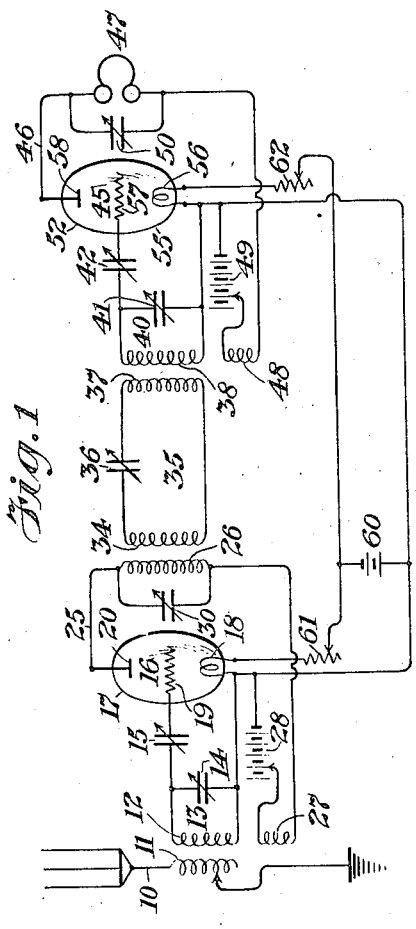
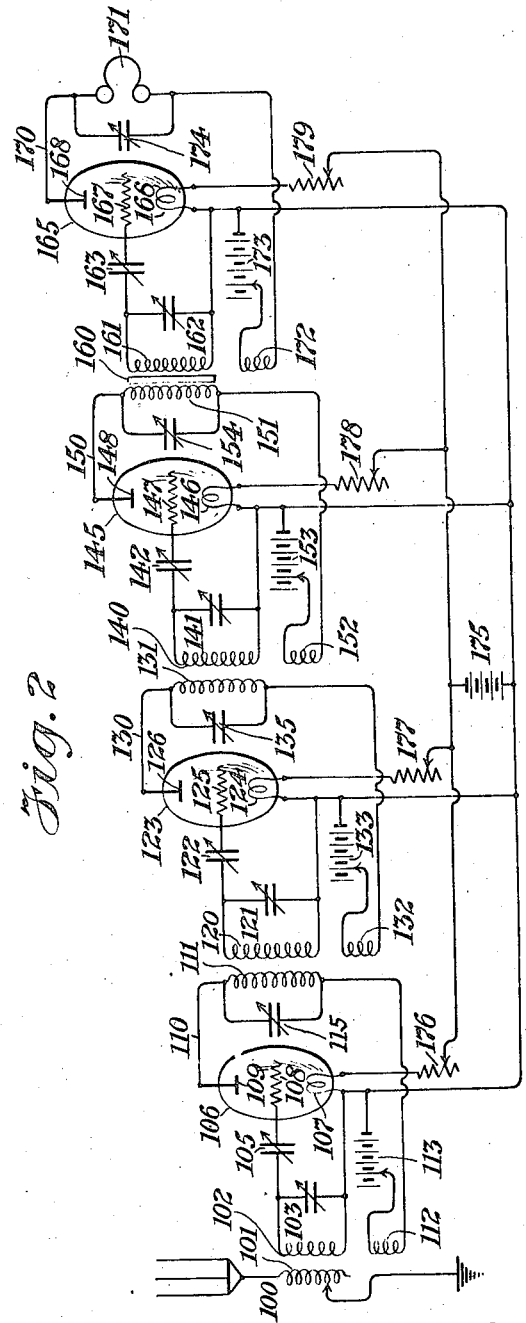
WITNESS
Chas. J. Clagett
INVENTOR
Emory Leon Chaffee
by
A. J. Gardner
HIS ATTORNEY Oct. 9, 1923.                                              1,469,889
                        E. L. CHAFFEE
              RECEIVING SYSTEM FOR RADIANT ENERGY
          Original Filed April 25, 1918.    3 Sheets-Sheet 2

Fig. 3

WITNESS
Chas. F. Clagett

INVENTOR
Emory Leon Chaffee
BY
A. F. Gardner
HIS ATTORNEY

Oct. 9, 1923.
E. L. CHAFFEE
1,469,889
RECEIVING SYSTEM FOR RADIANT ENERGY
Original Filed April 25, 1918   3 Sheets-Sheet 3
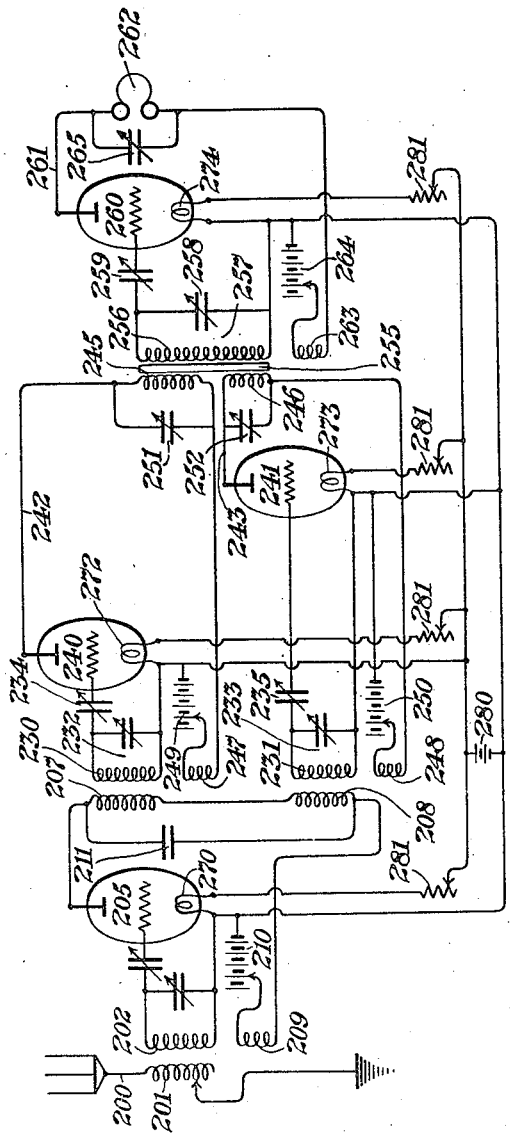
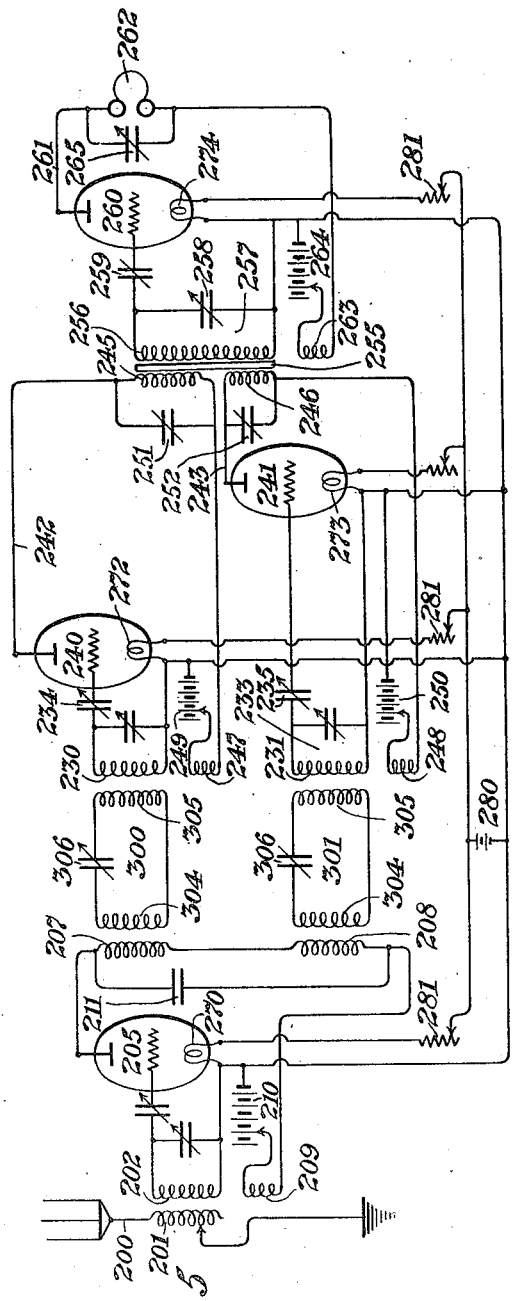
WITNESS
Chas. F. Clagett
INVENTOR
Emory Leon Chaffee
BY
A. J. Gardner
HIS ATTORNEY Patented Oct. 9, 1923.

1,469,889

UNITED STATES PATENT OFFICE.

EMORY LEON CHAFFEE, OF BELMONT, MASSACHUSETTS, ASSIGNOR TO JOHN HAYS HAMMOND, JR., OF GLOUCESTER, MASSACHUSETTS.

RECEIVING SYSTEM FOR RADIANT ENERGY.

Application filed April 25, 1918, Serial No. 230,723. Renewed February 11, 1922. Serial No. 535,947.

*To all whom it may concern:*

Be it known that I, EMORY LEON CHAFFEE, a citizen of the United States, and a resident of Belmont, county of Middlesex, and State of Massachusetts, have invented certain new and useful Improvements in Receiving Systems for Radiant Energy, of which the following is a specification.

Some of the objects of this invention are to provide an improved receiving system for radiant energy adapted to receive waves of high frequency having impressed thereon a series of periodic variations of a different frequency; to provide an improved receiving system for radiant energy adapted to receive waves of high frequency having impressed thereon a plurality of series of periodic variations of frequencies differing from each other and from the high frequency; to provide in a receiving system for radiant energy improved means for increasing the selectivity of the system and for amplifying the operation of the system; and to provide other improvements as will appear hereinafter.

In the accompanying drawings Fig. 1 is a diagram of a receiving system constructed in accordance with this invention; Figs. 2, 3, 4 and 5 are diagrams of four different modifications of the same.

Referring to the drawings and particularly to Fig. 1, one form of receiving system constructed in accordance with this invention comprises an open aerial receiving circuit 10 which is tuned to the high frequency of the waves intended to be received by this system, for instance to a frequency of one million oscillations per second. This open circuit 10 includes a primary coil 11 which is inductively coupled to a secondary coil 12 which is in a closed oscillatory circuit 13 which includes a variable condenser 14 and which is tuned to the same high frequency as the open circuit 10. This closed circuit 13 is arranged to act through a variable condenser 15 to control a detector 16 of any well known or suitable form, the detector shown being a well known gaseous or evacuated detector including an evacuated glass bulb 17 containing a filament 18, a grid 19 and a plate or terminal 20. The detector 16 is arranged to control a circuit 25 including a primary coil 26, and an auxiliary coil 27 and a high potential battery 28. The shunting condenser 30 is shunted around the primary coil 26 to permit electrical oscillations to flow around the coil 26 and through the circuit 25.

The auxiliary coil 27 is inductively and variably coupled to the secondary coil 12 of the closed oscillatory circuit 13, and forms a "tickler" coil which acts in a well known manner to increase the sensitiveness of the detector 16 as an amplifier, the tickler coil 27 being so coupled to the secondary coil 12 as to render the detector 16 extremely responsive as a detector and amplifier of feeble oscillations, but to avoid having the detector 16 act as an oscillator.

For increasing the selectivity of the system, the primary coil 26 is inductively coupled to a secondary coil 34 which is in an isolated closed oscillatory circuit 35 which includes a variable condenser 36 and an auxiliary coil 37, and which is tuned to the frequency of the periodic variations impressed upon the waves received by the open circuit 10 which will be referred to hereinafter as the secondary frequency of the system and which may be, for instance, 20,000 oscillations per second.

For detecting and amplifying the oscillations of secondary frequency, and for impressing electrical beats thereon, the auxiliary coil 37 is inductively coupled to a coil 38 which is in a closed oscillatory circuit 40 which includes a variable condenser 41 and which is connected through a variable condenser 42 to a combined detector and electrical oscillator now known in the art as an autodyne 45 which is of well known construction, and which is arranged to control a circuit 46 including a telephone receiver 47 or other suitable receiving device, a tickler coil 48 and a high potential battery 49. A shunting condenser 50 is shunted around the telephone receiver 47 to permit electrical oscillations to flow in the circuit 46 around the telephone receiver 47. The tickler coil 48 is inductively and variably coupled to the coil 38 of the closed oscillatory circuit 40 and is so adjusted as to cause the autodyne 45 to act as an oscillator to set up oscillations in the closed circuit 40 and also to act as a detector and amplifier of the oscillations in the closed circuit 40. The autodyne 45 may be of any suitable construction, and in the form shown is of the same construction as the detector 16 and includes an evacuated glass bulb 55 containing a filament 56, a grid 57 and a plate or terminal 58. The filament 18 of the detector 16 and the filament 56 of the autodyne are arranged to be heated by a common battery 60 acting upon the two filaments through two variable resistances or rheostats 61 and 62 respectively.

The autodyne 45 and the closed circuit 40 controlled thereby may be adjusted so as to set up oscillations in the closed circuit 40 having a frequency differing from the secondary frequency of the system to such an extent as to act upon the oscillations of secondary frequency in the isolated circuit 35 in such a manner as to produce electrical "beats" having a predetermined and suitable frequency for causing the telephone receiver 47 to produce audible beats of the same frequency. For instance, when it is desired to produce 1000 electrical beats per second in the isolated circuit 35, the autodyne 45 and its closed circuit 40 should be adjusted to produce either 19,000 or 21,000 oscillations per second in the closed circuit 40, and for the sake of definiteness it is assumed that the arrangement is such in the system shown in Fig. 1 that the autodyne 45 produces 19,000 oscillations per second in the closed circuit 40, and consequently produces 1000 electrical beats per second in the isolated circuit 35.

In the operation of the system shown in Fig. 1, when a signal or impulse of radiant energy is received, comprising electro-radiant waves having the required high frequency of, for instance, one million per second, and having impressed thereon a series of periodic amplitude variations or other variations of the required secondary frequency of, for instance, twenty thousand variations per second, the open aerial circuit 10 will cause corresponding oscillations to be set up in the closed circuit 13 and having impressed thereon corresponding period variations of 20,000 per second. These oscillations and periodic variations will act through the detector 16 to cause unidirectional impulses of 1,000,000 per second and having impressed thereon periodic variations of 20,000 per second to flow through the controlled circuit 25 including the primary coil 26. As the isolated circuit 35 is tuned to the secondary frequency of 20,000 per second, the unidirectional impulses in the primary coil 26 will cause oscillations of 20,000 per second to be set up in the isolated circuit 35. Through the action of the autodyne 45 and closed circuit 40 oscillations having a frequency of 19,000 per second will be set up in the isolated circuit 35 and will combine with the oscillations of 20,000 per second in this circuit to produce electrical beats of 1,000 per second. These combined oscillations and beats will act through the closed circuit 40 and through the autodyne 45 to produce corresponding unidirectional impulses and beats through the controlled circuit 46 containing the telephone receiver 47, and the action of the beats will produce an audible tone in the form of 1,000 tone vibrations per second in the telephone receiver 47.

In Fig. 2 is shown a modified form of receiving system constructed in accordance with this invention and comprising an open aerial circuit 100 which is tuned to the high frequency of the waves intended to be received by the system, for instance, to 1,000,000 oscillations per second. The open circuit 100 includes a primary coil 101 which is inductively coupled to a secondary coil 102 which is in a closed oscillatory circuit 103 tuned to the same frequency as the open circuit 100, and which is arranged to act through a condenser 105 to control a detector 106, constructed as hereinbefore described, and including a filament 107, a grid 108 and a plate or terminal 109. The detector 106 controls a circuit 110 including a primary coil 111, a tickler coil 112 and a battery 113. A shunting condenser 115 is shunted around the primary coil 111 to permit electrical oscillations to pass around the coil. The tickler coil 112 is variably coupled to the secondary coil 102 and is so adjusted as to increase the sensitiveness of the detector 106 as an amplifier, but not to the point of causing it to act as an oscillator for producing oscillations in the closed circuit 103.

For amplifying the secondary frequency of the system, the primary coil 111 is inductively coupled to a secondary coil 120 which is in a closed circuit 121 which is tuned to the secondary frequency of the system, for instance to 20,000 oscillations per second. This closed circuit 121 is arranged to act through a condenser 122 to control an amplifier 123, constructed as hereinbefore described, including a filament 124, a grid 125 and a plate or terminal 126. The amplifier 123 is arranged to control a circuit 130 including a coil 131, a tickler coil 132 and a battery 133. The tickler coil 132 is inductively and variably coupled to the secondary coil 120 in such a manner as to increase the sensitiveness of the amplifier 123, but not to the point to cause the amplifier 123 to act to produce oscillations in the closed circuit 121. A shunting condenser 135 is shunted around the primary coil 131 to permit the oscillations to pass around the primary coil 131.

To produce electrical beats having a frequency for instance of 1,000 oscillations per second in the system, the primary coil 131 is inductively connected to a coil 140 which is in a closed oscillatory circuit 141 which is connected through a condenser 142 to an autodyne 145 constructed as hereinbefore described and including a filament 146, a grid 147 and a plate or terminal 148. The autodyne 145 controls a circuit 150 including a primary coil 151, a tickler coil 152 and a battery 153. A shunting condenser 154 is shunted around the coil 151 to permit electrical oscillations to pass around the coil 151. The tickler coil 152 is inductively and variably coupled to the coil 140, and the adjustment of the autodyne 145 and its cooperating circuits is such that oscillations having a frequency of, for instance, 1,000 oscillations per second above or below the secondary frequency of the system will be produced in the closed circuit 141 by the action of the autodyne 145 and will combine with the oscillations of secondary frequency of 20,000 per second set up in the closed oscillatory circuit 141 inductively as the result of the incoming waves to produce electrical beats for a frequency of 1,000 per second in the closed oscillatory circuit 141.

For amplifying the electrical beats set up in the system by the autodyne 145, the primary coil 151 is inductively coupled through an iron core 160 to a secondary coil 161 which is in a closed circuit 162 which is tuned to oscillate at the beat frequency, for instance, of 1,000 oscillations per second. This closed circuit 162 is arranged to control through a condenser 163 an amplifier 165 construction as hereinbefore described and including a filament 166, a grid 167 and a plate or terminal 168. This amplifier 165 is arranged to control a circuit 170 including a telephone receiver 171 or other suitable receiving instrument, a tickler coil 172 and a battery 173. A shunting condenser 174 is shunted around the telephone receiver 171 to permit electrical oscillations to pass around the receiver. The tickler coil 172 is inductively and variably coupled to the corresponding secondary coil 161 in such a manner as to increase the sensitiveness of the amplifier 165. The filaments 107, 124, 146 and 166 are arranged to be heated by a common battery 175 acting upon the several filaments respectively through corresponding rheostats 176, 177, 178 and 179.

In the operation of the system shown in Fig. 2, when electroradiant oscillations having a frequency of 1,000,000 per second, and having impressed thereon periodic amplitude variations or other variations having a frequency of 20,000 per second, are received by the open circuit 100, these oscillations thus modified act through the primary detector 106 to set up corresponding unidirectional impulses of one million per second periodically varied or modified in amplitude or otherwise at the rate of 20,000 variations per second. These unidirectional impulses act to set up oscillations having a frequency of 20,000 per second in the closed circuit 121 and these oscillations act through the secondary amplifier 123 to set up corresponding unidirectional impulses of 20,000 per second in the circuit 130 including the coil 131. These impulses act inductively to set up corresponding oscillations of 20,000 per second in the closed circuit 141 in which electrical beats are produced as hereinbefore described by the action of the autodyne 145. These combined oscillations of 20,000 and 21,000 per second, forming the beats, act through the autodyne 145 to produce corresponding unidirectional impulses in the controlled circuit 150 which act inductively upon the closed circuit 162 to set up therein oscillations having a frequency of 1,000 per second which are detected and amplified by the amplifier 165 to cause corresponding unidirectional impulses of 1,000 per second to be set up through the circuit 170 containing the telephone receiver 171, and these impulses cause the receiver 171 to emit an audible tone having 1,000 vibrations per second.

In Fig. 3 is shown a modified form of receiving system constructed in accordance with this invention and arranged to receive high frequency oscillations having impressed thereon two series of periodic amplitude variations or other variations having two different frequencies respectively, which both differ in frequency from the high frequency oscillations and which may for convenience be referred to hereinafter as the secondary frequencies of the system. This modifid system includes an open aerial circuit 200 which is tuned to the high frequency of the received waves, for instance, to 1,000,000 oscillations per second. The open aerial circuit 200 includes a primary coil 201 which is inductively coupled to a secondary coil 202 which is in a closed oscillatory circuit 203 which is tuned to the same frequency as the open circuit 200, and which is arranged to control a primary detector 205 arranged to control a circuit 206 including two primary coils 207 and 208, a tickler coil 209 and a battery 210. A shunting condenser 211 is shunted around the two coils 207 and 208. The tickler coil 209 is inductively and variably coupled to the secondary coil 202 in such a manner as to increase the sensitiveness of the primary detector 205 acting as an amplifier. The coils 207 and 208 are inductively coupled respectively to two secondary coils 215 and 216, which are arranged respectively in two closed oscillatory circuits 217 and 218 containing respectively two variable condensers 219 and 220. These two circuits 217 and 218 are tuned respectively to the two secondary frequencies of the system, for instance, to 20,000 and 30,000 oscillations per second, and are arranged to act through a condenser 220 to control a secondary amplifier 225 which controls a circuit 226 including two coils 227, 228 and a battery 229.

For producing electrical beats having a frequency of, for instance, 1,000 per second in the system, the two coils 227 and 228 are inductively coupled respectively to two coils 230 and 231 which are arranged respectively in two closed oscillatory circuits 232 and 233 tuned respectively to 20,000 and 30,000 oscillations per second and which act through two condensers 234 and 235 to control and be controlled respectively by two autodynes 240 and 241 constructed as hereinbefore described, and arranged to control respectively two circuits 242 and 243 containing respectively two primary coils 245 and 246, two tickler coils 247 and 248, and two batteries 249 and 250. Two shunting condensers 251 and 252 are shunted respectively around the two primary coils 245 and 246 to permit electrical oscillations to flow around these coils. The two tickler coils 247 and 248 are inductively and variably connected as hereinbefore described to the two coils 230 and 231. The two autodynes 240 and 241 and their cooperating circuits are so adjusted that these two autodynes set up oscillations in the two circuits 232 and 233 respectively of frequencies differing respectively from the two secondary frequencies of the system, for instance by 1,000 oscillations per second. For instance, the adjustment may be such that the two autodynes 240 and 241 set up in the closed circuits 232 and 233 oscillations having respectively frequencies of 19,000 and 29,000 per second, or of 21,000 and 31,000 per second, or of any other suitable frequencies to produce the same number of beats.

For amplifying the electrical beats, the two primary coils 245 and 246 are inductively coupled through an iron core 255 to a common secondary coil 256 which is in a closed oscillatory circuit 257 including a variable condenser 258, and which is tuned to the beat frequency of the system, for instance, to 1,000 oscillations per second. This closed circuit 257 is arranged to act through a condenser 259 to control an amplifier 260 constructed as hereinbefore described. The amplifier 260 is arranged to control a circuit 261 which contains a telephone receiver 262 or other suitable receiving instrument, a tickler coil 263 and a battery 264. A shunting condenser 265 is shunted around the telephone receiver 262 to permit electrical oscillations to pass around the receiver. The tickler coil 263 is inductively and variably coupled to the secondary coil 256 and is adjusted to increase the sensitiveness of the amplifier 260. The filaments 270, 271, 272, 273 and 274 of the system are arranged to be heated by a common battery 280 acting upon the filaments respectively through corresponding rheostats 281, but these filaments might be arranged to be separately heated.

In the operation of the system shown in Fig. 3 when electrical oscillations having the predetermined high frequency of 1,000,000 per second, and having impressed thereon two series of periodic amplitude variations or other amplitude variations having the required frequencies respectively of 20,000 and 30,000 oscillations per second, are received by the open circuit 200, these oscillations thus modified act through the primary condenser 205 to set up corresponding unidirectional oscillations in the controlled circuit 206 which act through the coils 207 and 208 to set up corresponding oscillations of 20,000 per second and 30,000 per second in the two closed circuits 217 and 218 which act through the secondary amplifier 225 to cause two corresponding series of unidirectional impulses, having frequencies of 20,000 and 30,000 respectively, to be set up in the controlled circuit 226. These unidirectional impulses act inductively upon the circuits 232 and 233 of the autodynes 240 and 241 to set up therein oscillations of 20,000 and 30,000 per second respectively, and these oscillations combine with the oscillations of 21,000 and 31,000 set up by the autodynes 240 and 241 in these circuits to produce in each of these circuits electrical beats having a frequency of 1,000 per second. These electrical beats act through the two autodynes 240 and 241 to produce corresponding unidirectional impulses of 1,000 per second in the two circuits 242 and 243 which include the two primary coils 245 and 246. These impulses act through the two primary coils 245 and 246 to set up oscillations having a frequency of 1,000 per second in the closed circuit 257 which is tuned to the beat frequency and which acts through the amplifier 260 to set up corresponding unidirectional impulses having a frequency of 1,000 per second in the controlled circuit 261 and consequently causes the telephone receiver 262 to emit an audible tone having a frequency of 1,000 vibrations per second.

In Fig. 4 is shown a modified form of the receiving system constructed in accordance with this invention. In this form the construction and operation are the same as those of the form shown in Fig. 3 except that in Fig. 4 the secondary amplifier 225 and its cooperating circuits are omitted and the autodynes 240 and 241 are arranged to be controlled directly by the two hereinbefore described primary coils 207 and 208 of the primary detector 205, and the function of the secondary amplifier 225 is consequently omitted, the function of the secondary amplifier 225 being to amplify the two series of periodic variations.

In Fig. 5 is shown a further modified form of receiving system constructed in accordance with this invention, and in this modified form the construction and operation are the same as those of the system shown in Fig. 4 except that in the system shown in Fig. 5, two isolated closed oscillatory circuits 300 and 301, each of which contains two coils 304 and 305 and a variable condenser 306, are inductively interposed respectively between the two primary coils 207 and 208 of the primary detector 205 and the two coils 230 and 231 of the two autodynes 240 and 241. These two isolated circuits 300 and 301 are tuned respectively to the two secondary frequencies of, for instance, 20,000 and 30,000 per second of the system and serve to increase the selectivity of the system.

Although only a few of the many forms in which this invention may be embodied have been shown herein, it is to be understood that the invention is not limited to any specific system but might be embodied in various systems without departing from the spirit of the invention or the scope of the appended claims.

Having thus described this invention, I claim and desire to protect by Letters Patent:

1. In a receiving system for radiant energy, the combination with an initial receiving circuit responsive to a wave of radiant energy having a predetermined frequency and modulated at a second frequency of means controlled by said receiving means and tuned to respond to said predetermined secondary frequency, local means including an autodyne arranged to produce oscillations having a frequency different from said secondary frequency, and to cooperate with said second mentioned means to produce electrical beats, and a receiving device arranged to be controlled as a result of the action of said electrical beats.

2. In a receiving system for radiant energy, the combination with an initial receiving circuit responsive to a wave of radiant energy having a predetermined frequency and modulated at a plurality of secondary frequencies, of a plurality of elements controlled by said circuit and arranged to respond to said secondary frequencies respectively, local means cooperating with said elements for producing with each of said elements electrical beats having a predetermined frequency, and a receiving device arranged to be controlled as a result of the action of said beats.

3. In a receiving system for radient energy, the combination with an initial receiving circuit responsive to a wave of radiant energy having a predetermined frequency and modulated at a plurality of secondary frequencies, of a plurality of elements controlled by said circuit and arranged to respond to said plurality of different secondary frequencies respectively, local means including a plurality of autodynes cooperating with said elements for producing with each of said elements electrical beats having a predetermined frequency, and a receiving device arranged to be controlled as a result of the action of said beats.

4. In a receiving system for radiant energy, the combination with an initial receiving circuit responsive to a wave of radiant energy having a predetermined frequency and modulated at a plurality of secondary frequency, of a plurality of elements controlled by said circuit and arranged to respond to said plurality of different secondary frequencies respectively, local means cooperating with said elements for producing with each of said elements electrical beats having a predetermined frequency, an element tuned to respond to the action of said beats, and a receiving device controlled as a result of the action of said beats upon said element.

5. In a receiving system for radiant energy, the combination with an initial receiving circuit responsive to radiant waves having a predetermined frequency and modulated at a plurality of other frequencies, of a plurality of elements controlled by said circuit and arranged to respond to said plurality of different secondary frequencies respectively, local means including a plurality of autodynes cooperating with said elements for producing with each of said elements electrical beats having a predetermined frequency, an element tuned to respond to the action of said beats, and a receiving device controlled as a result of the action of said beats upon said element.

6. In a system for receiving electrical oscillations, the combination with a circuit tuned to respond to oscillations having a predetermined frequency, of means including an autodyne arranged to produce electrical oscillations in said circuit having a frequency different from said first-mentioned frequency to produce electrical beats in said circuit, said means being also operative to detect said beats, a circuit tuned to respond to said beats and arranged to be controlled thereby, a detector controlled by said second-mentioned circuit, a circuit controlled by said detector, and a receiving device controlled by said last-named circuit.

7. A system for receiving electrical oscillations, comprising an open aerial circuit arranged to respond to electro-radiant oscillations having a high frequency, a detector controlled by said open circuit, a plurality of secondary circuits tuned to different secondary frequencies respectively and arranged to be controlled by said detector, local means for producing electrical "beats"

in said secondary circuits having the same frequency in all of said secondary circuits, said means being operative to detect and to amplify said "beats", a circuit tuned to respond to said "beats" and controlled by said means, a detector controlled by said circuit, and a circuit including a receiving device and a source of energy controlled by said last-mentioned detector.

8. A system for receiving electrical oscillations, comprising a plurality of circuits tuned to different frequencies respectively, local means for producing in said circuits electrical oscillations differing in frequency respectively from said first-mentioned frequencies in such a manner as to produce in said circuits electrical "beats" having the same frequency in all of said circuits, said means being operative to detect said "beats" and to amplify the same, and means tuned to respond to said beats and arranged to be controlled by said means.

Signed at Cambridge, in the county of Middlesex and State of Massachusetts, this 22nd day of April, A. D. 1918.

EMORY LEON CHAFFEE.